United States Patent [19]

Murakami

[11] Patent Number: 4,488,660
[45] Date of Patent: Dec. 18, 1984

[54] VACUUM BOTTLE

[75] Inventor: Morio Murakami, Neyagawa, Japan

[73] Assignee: Tiger Vacuum Bottle Industrial Company, Limited, Osaka, Japan

[21] Appl. No.: 405,086

[22] Filed: Aug. 4, 1982

[30] Foreign Application Priority Data

Oct. 12, 1981 [JP] Japan .................. 56-152294[U]

[51] Int. Cl.$^3$ ............................................. A47J 41/02
[52] U.S. Cl. ................................ 220/425; 215/12 A; 215/13 R
[58] Field of Search ............... 215/13 A, 12 A, 13 R, 215/100 A; 220/420, 425, 421

[56] References Cited

U.S. PATENT DOCUMENTS

| | | | |
|---|---|---|---|
| 1,071,817 | 9/1913 | Stanley | 215/13 R X |
| 1,612,656 | 12/1926 | Walther | 215/13 R |
| 2,076,550 | 4/1937 | Conner | 215/13 R |
| 2,315,425 | 3/1943 | Hill et al. | 220/425 |
| 2,601,573 | 6/1952 | Venis | 215/13 R |
| 2,812,874 | 11/1957 | Casalino | 215/13 R |
| 2,828,043 | 3/1958 | Hosford, Jr. | 220/425 |
| 3,331,522 | 7/1967 | Bridges | 220/420 X |
| 3,341,045 | 9/1967 | Sandler | 215/13 R |
| 3,871,543 | 3/1975 | Chadfield et al. | 215/13 R |
| 4,351,451 | 9/1982 | Chung | 220/420 |

FOREIGN PATENT DOCUMENTS

| | | | |
|---|---|---|---|
| 315353 | 11/1919 | Fed. Rep. of Germany | 215/13 R |
| 1806872 | 10/1969 | Fed. Rep. of Germany | 215/13 R |
| 1122761 | 5/1956 | France | 215/13 R |
| 1330247 | 12/1963 | France | 215/13 R |
| 443261 | 12/1948 | Italy | 215/13 R |
| 53-153260 | 12/1978 | Japan . | |
| 55-83038 | 6/1980 | Japan . | |
| 55-151237 | 10/1980 | Japan . | |
| 9050 | of 1909 | United Kingdom | 215/13 R |
| 776218 | 6/1957 | United Kingdom | 215/13 A |
| 931613 | 7/1963 | United Kingdom | 215/13 R |

Primary Examiner—William Price
Assistant Examiner—Sue A. Weaver
Attorney, Agent, or Firm—Hubbard, Thurman, Turner & Tucker

[57] ABSTRACT

A vacuum bottle including an inner member defining a spout and receiving contents and a metallic outer member sealingly associated with the inner member and cooperating therewith to define a vacuum space therebetween. The metallic outer member includes a tubular portion and a reduced diameter portion connected thereto to define a shoulder between the tubular portion and the reduced diameter portion. A shoulder assembly formed of a high molecular material for protecting the shoulder from shock is integrally formed with a thread with which engages a cup-like member capable of serving as a cup.

28 Claims, 9 Drawing Figures

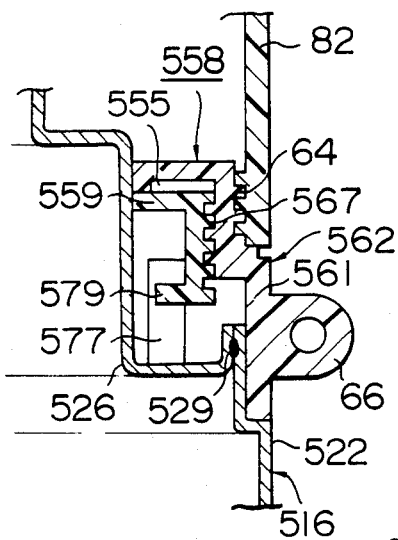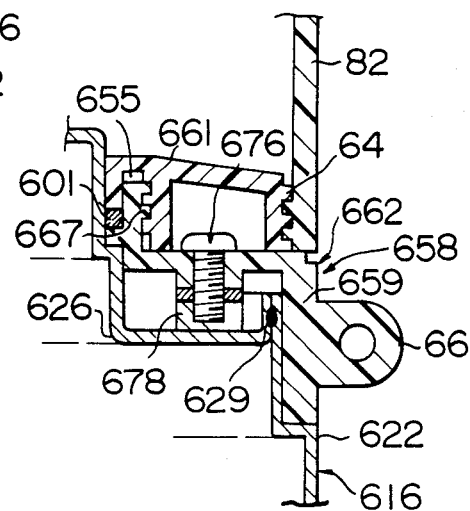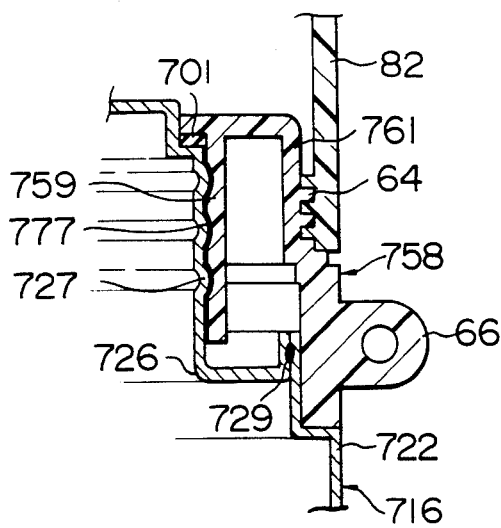

VACUUM BOTTLE

BACKGROUND OF THE INVENTION (1) Field of the Invention

The present invention relates to a vacuum bottle.

(2) Description of the Prior art

A vacuum bottle disclosed in Japanese Patent Laying-Open No. 151237/80, for example, comprises a tubular body including an inner member defining a spout and receiving contents, and a metallic outer member sealingly associated with the inner member and cooperating therewith to define a vacuum space therebetween. The metallic outer member has a tubular portion, and a reduced diameter portion located adjacent to the spout and connected to the tubular portion to define a shoulder between the tubular portion and the reduced diameter portion. A closure is associated with the spout so as to allow the spout to be opened. A cup-like member is removably and threadedly engageable with a thread formed on the tubular portion of the metallic outer member.

However, the vacuum bottle disclosed in Japanese Patent Laying-Open No. 151237/80 has such disadvantages that when the cup-like member is disengaged from the thread on the tubular portion of the outer member, the shoulder of the outer member is directly exposed and the exposed shoulder is liable to be damaged, and that since the outer member is formed of metal, it is difficult to form the thread on the tubular portion of the outer member.

Japanese Utility Model Laying-Open No. 153260/78 discloses a cover formed of a synthetic resinous material which surrounds the reduced diameter portion of the outer member to protect the shoulder from shock. However, the prior art requires wholly separate and additional means for the attachment of a cup-like member and is complicated in structure.

SUMMARY OF THE INVENTION

An object of the present invention is to provide a vacuum bottle which secures and facilitates the formation of a thread with which a cup-like member is engaged.

According to the present invention, there is provided a vacuum bottle comprising: a tubular body including an inner member defining a spout and receiving contents and a metallic outer member sealingly associated with the inner member and cooperating therewith to define therebetween a vacuum space, the metallic outer member including a tubular portion and a reduced diameter portion located adjacent to the spout and connected to the tubular portion to define a shoulder between the tubular portion and the reduced diameter portion; a shoulder assembly formed of a high molecular material including a main body having an outer peripheral surface and extending around the reduced diameter portion of the outer member so as to cover the shoulder, and a thread integrally formed on the outer peripheral surface of the main body; a closure associated with the spout so as to allow the spout to be opened; and a cup-like member removably and threadedly engageable with the thread formed on the main body of the shoulder assembly so as to cover the closure.

BRIEF DESCRIPTION OF THE DRAWINGS

FIG. 7 is a view similar to FIG. 2, but showing a fifth embodiment of the present invention;

FIG. 8 is a view similar to FIG. 2, but showing a sixth embodiment of the present invention;

FIG. 9 is a view similar to FIG. 2, but showing a seventh embodiment of the present invention.

DETAILED DESCRIPTION OF THE PREFERRED EMBODIMENTS

Figure 1:
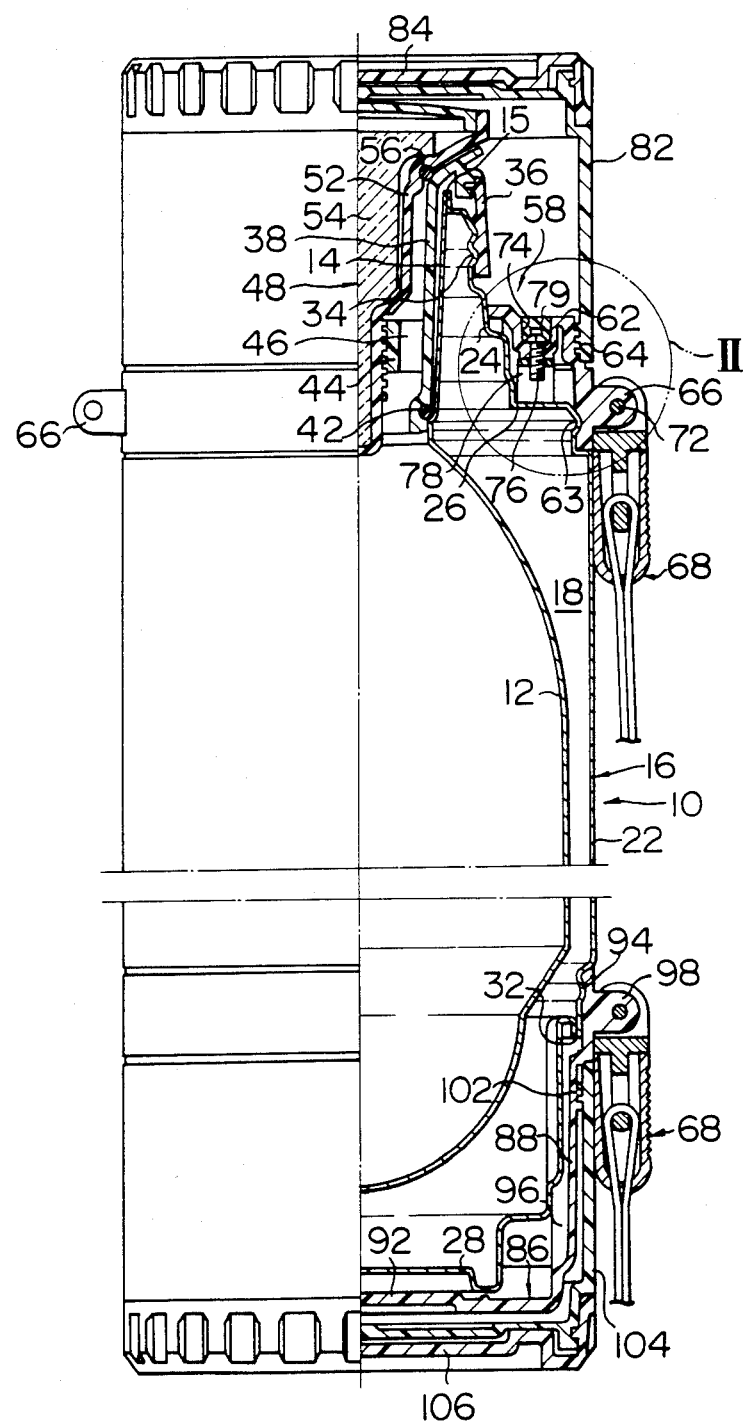
FIG. 1 is a front view of a vacuum bottle in accordance with an embodiment of the present invention, with a right half portion shown in cross-section.

Referring to FIG. 1, there is shown a portable vacuum bottle in accordance with an embodiment of the present invention. The vacuum bottle comprises a cylindrical body 10 which includes an inner member 12 formed of stainless steel having an opening 14 and receiving contents, such as liquid, and an outer member 16 formed of stainless steel sealingly joined by welding at 15 to the edge of the opening 14 of the inner member 12 and cooperating with the inner member 12 to define a vacuum space 18 between the inner and outer members. The outer member 16 includes an elongated cylindrical portion 22, a reduced diameter portion 24 located adjacent to the opening 14 and integrally connected to the cylindrical portion 22 to define therebetween a shoulder 26, and a closed end portion 28 sealingly joined by welding at 32 to an end of the cylindrical portion 22 opposite to the reduced diameter portion 24.

The reduced diameter portion 24 of the outer member 16 is formed with a thread 34 with which a collar 36 formed of a synthetic resinous material is engaged. A mouth member 38 formed of a synthetic resinous material has one axial end thereof in threaded engagement with the collar 36 and the other axial end in pressing engagement with an inner wall surface of the opening 14 through an O-ring 42. A threaded collar 44 is spaced radially inwardly from the mouth member 38 and integrally connected thereto through a plurality of radially extending and circumferentially spaced ribs 46.

A closure or lid 48 having an outer shell 52 formed of a synthetic resinous material and a heat insulating material 54 filled within the shell 52 is in threaded engagement with the threaded collar 44 and movable, when the lid 48 is turned, between a closed position in which an O-ring 56 carried by the lid 48 is into contact with the mouth member 38 and an open position in which the O-ring 56 is out of contact with the mouth member 38 to allow the contents to be poured through flow passages between the ribs 46 and a flow passage between the lid 48 and the mouth member 38. The lid 48 is able to be completely disengaged and removed from the threaded collar 44 to allow contents to be refilled in the inner member 12.

Figure 2:
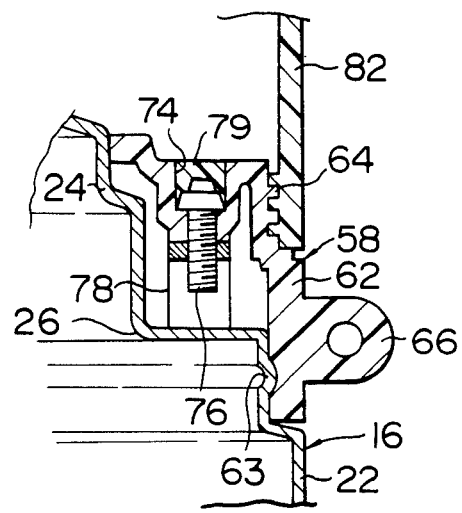
FIG. 2 is a sectional view, on an enlarged scale, of a portion II encircled by a phantom line.

A shoulder assembly 58 of circumferentially continuous annular cross-section and formed of a moldable high molecular material, such as plastics, hard rubber or the like comprises, as shown clearly in FIG. 2, a main body 62 extending around the reduced diameter portion 24 so as to cover the shoulder 26 to protect the same from shock. The main body 62 has formed on its outer peripheral surface a thread 64. The main body 62 has an annular groove which is formed on its inner peripheral surface and which engages with an annular bead 63 formed on the cylindrical portion 22 of the outer member 16 so that the shoulder assembly 58 is snap-fitted on the tubular portion 22. A pair of diametrically opposed projections 66 are formed integrally with the main body 62 and project radially outwardly from the outer circumferential surface of the body. Each of the projections 66 has formed therethrough a bore. An elongated suspension member or suspending string assembly 68 has opposite ends thereof respectively attached to the projections 66 through pins 72 fitted in the bores in the projections 66. The main body 62 has an annular groove 74 which has formed through its bottom at least one bore to receive a screw 76 therein. The screw 76 threadedly engages with a threaded bore in a bracket 78 welded to the shoulder 26 between the body portion 22 and reduced diameter portion 24 of the outer member 16, to prevent the shoulder assembly 58 from being relatively moved to the outer member 16. The screw 76 has its head concealed by a ring 79 of a synthetic resinous material force-fitted in the annular groove 74.

A cup-like member 82 of a synthetic resinous material is removably and threadedly engaged with the thread 64 on the outer peripheral surface of the main body 62 of the shoulder assembly 58 so as to cover the lid 48. When the cup-like member 82 is disengaged from the thread 64, the cup-like member 82 can serve as a cup. The cup-like member 82 carries a disc-shaped shock absorbing member 84 formed of rubber fitted onto the outer surface of the bottom of the cup-like member 82 to protect the same from shock.

A bottom cover 86 of a synthetic resinous material disposed so as to cover the closed end portion 28 of the outer member 16 has a cylindrical portion 88 and a bottom wall 92 integral therewith. The cylindrical portion 88 is formed, at its end portion opposite to its bottom end, with a peripheral groove which engages with an annular bead 94 formed on the cylindrical portion 22 of the outer member, to enable the bottom cover 86 to be snap-fitted on the outer member 16. The bottom cover 86 has formed on the inner surface of the tubular portion 88 preventing means comprising a plurality of axially extending ribs 96 which are fitted in axial grooves formed on the outer peripheral surface of the closed end portion 28 of the outer member 16, to prevent the bottom cover 86 from being relatively rotated to the closed end portion 28. A projection 98 is formed integrally with the cylindrical portion 88 and projects radially outwardly from the outer peripheral surface of the cylindrical portion 88 to enable one end of the suspending string assembly 68 to be attached to the projection 98, if the other end of the suspending string assembly 68 is attached to only one of the pair of projections 66. Stated differently, the opposite ends of the suspending string assembly 68 may be attached to the pair of projections 66, respectively, or to one of the pair of projections 66 and the projection 98, respectively. The bottom cover 86 is formed at the outer peripheral surface of the cylindrical portion 88 with a thread 102.

A cup-shaped member 104 of a synthetic resinous material is removably and threadedly engaged with the thread 102 on the cylindrical portion 88 of the bottom cover 86 so as to cover the bottom cover 86. When the cup-shaped member 104 is disengaged from the thread 102, the cup-shaped member 104 can serve as a cup. The cup-shaped member 104 has a disk-like shock adsorbing member 106 formed of rubber fitted onto the outer surface of the bottom of the member 104 to protect the same from shock.

In the vacuum bottle described with reference to FIGS. 1 and 2, the cup-shaped member 82 is threadedly engaged with the thread 64 formed on the main body 62 of the shoulder assembly 58 protecting the shoulder 26 defined between the reduced diameter portion 24 and the cylindrical portion 22 of the outer member 16 of the cylindrical body 10. This arrangement permits the thread 64 to be readily formed, because the shoulder assembly 58 which has the main body 62 having formed thereon the thread 64 is made of synthetic resin material. In addition, the projections 66 to which the suspending string assembly 68 is attached are formed integrally with the main body 62, and it is facilitated to form the projections 66.

Figure 3:
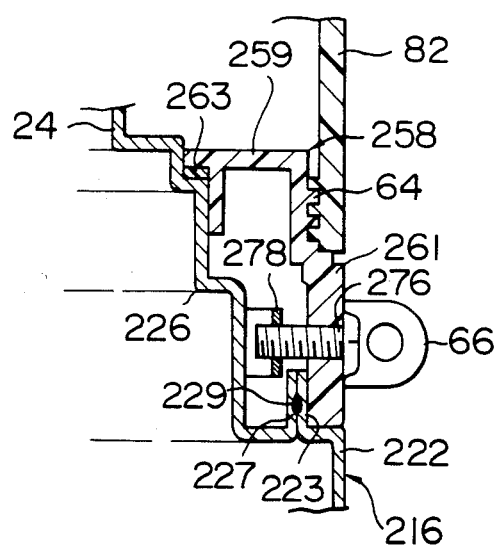
FIG. 3 is a view similar to FIG. 2, but showing a second embodiment of the present invention.

FIG. 3 shows another embodiment wherein parts and members similar to those shown in FIGS. 1 and 2 are designated by like reference characters. In the embodiment shown in FIG. 3, an outer member 216 of the bottle body comprises a cylindrical portion 222 formed with an axially extending annular flange 223 and a reduced diameter portion 24 to define a shoulder 226 between the cylindrical portion 222 and the reduced diameter portion. The shoulder 226 has an axially extending annular flange 227 which abuts against the flange 223 and is sealingly welded thereto at 229. A shoulder assembly 258 for protecting the shoulder 226 has a substantially inverted L-shaped circumferentially continuous annular cross-section and has two annular legs 259 and 261. One leg 259 presses against the reduced diameter portion 24 through an annular sealing member 263 and the other leg 261 abuts against the welded flanges 223 and 227. The other leg 261 has formed therethrough at least one bore for receiving therein a screw 276 which is threadedly engaged with a threaded bore formed in a bracket 278 welded to the shoulder 226, thereby to prevent the shoulder assembly 258 from being relatively rotated to the outer member 216.

Other construction and operation thereof of the embodiment shown in FIG. 3 are substantially similar to those of the embodiment described with reference to FIGS. 1 and 2, so that their description will not be repeated here.

Figure 4:
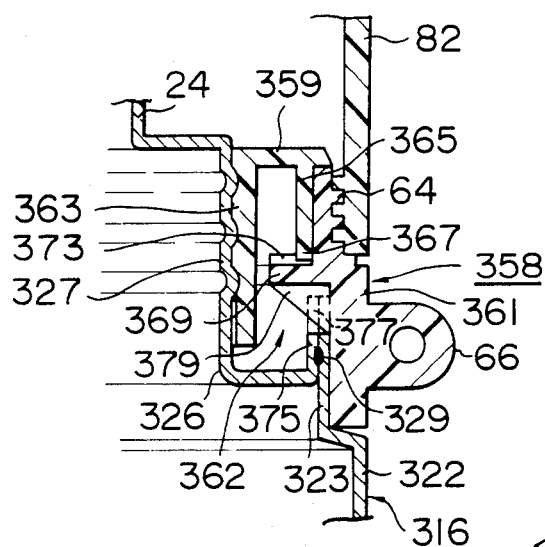
FIG. 4 is a view similar to FIG. 2, but showing a third embodiment of the present invention.
Figure 5:
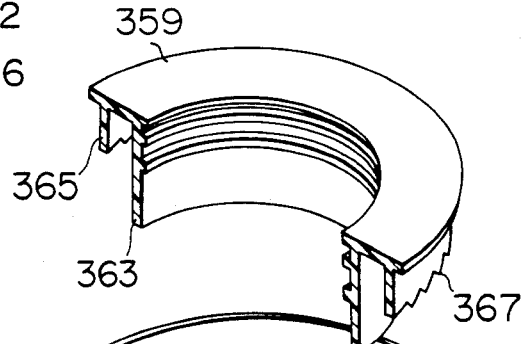
FIG. 5 is a fragmentary exploded perspective view of the shoulder assembly shown in FIG. 4.

FIGS. 4 and 5 show a third embodiment wherein parts and members similar to those shown in FIGS. 1 and 2 are designated by like reference characters. In the embodiment shown in FIGS. 4 and 5, a main body 362 of a shoulder assembly 358 of circumferentially continuous annular cross-section for protecting a shoulder 326 has radially inner and outer annular sections 359 and 361. The radially inner and outer annular sections 359 and 361. The radially inner section 359 has an inner annular wall 363 and an outer annular wall 365 spaced radially outwardly therefrom in concentric relation to the wall 363. The inner annular wall 363 is in threaded engagement with a thread 327 formed on the shoulder 326, and the outer annular wall 365 is formed, as shown in FIG. 5, with a series of serrations 367 on its underside. The radially outer section 361 formed with integral projections 66 and thread 64 with which a cup-shaped member 82 is engaged has a radially inwardly extending integral ledge 369. The ledge 369 has integrally formed on its upper surface a series of serrations 373 which engage with the serrations 367 on the radially inner member 359. The serrations 367 and 373 are shaped such that they allow relative rotation of the radially inner and outer section 359 and 361 in one direction but prevent their relative rotation in the other direction.

The shoulder 326 has an axially projecting annular flange 375. The cylindrical portion 322 of the outer member 316 has an axially protruding annular flange 323. The flanges 375 and 323 abut against each other and are sealingly welded to each other at 329 so that the shoulder 326 and the body portion 322 are fixedly connected to each other. The flanges 375 and 323 abutting against each other have formed on their upper edges a plurality of circumferentially spaced notches 377. Ribs 379 integrally formed on the lower surface of the ledge 369 of the radially outer section 361 are respectively fitted into the notches 377 to prevent the shoulder assembly 358 from rotating relative to the outer member 316. Other structures and operation thereof of the embodiment shown in FIGS. 4 and 5 are similar to those of the embodiment described with reference to FIGS. 1 and 2, so that their description will not be repeated here.

Figure 6:
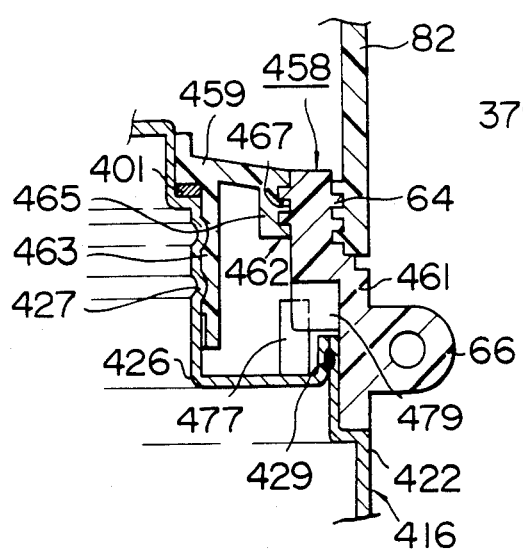
FIG. 6 is a view similar to FIG. 2, but showing a fourth embodiment of the present invention.

FIG. 6 shows a fourth embodiment wherein parts and members similar to those shown in FIGS. 1 and 2 are designated by like reference characters. In the embodiment shown in FIG. 6, a weld 429 similar to the weld 229 shown in FIG. 3 is formed between a cylindrical portion 422 and a shoulder 426 of an outer member 416. A main body 462 of a shoulder assembly 458 of circumferentially continuous annular cross-section is provided for protecting the shoulder 426 and has radially inner and outer annular sections 459 and 461. The radially inner annular section 459 has an inner annular wall 463 and an outer annular wall 465 radially outwardly spaced therefrom in concentric relation to the wall 463. The radially inner annular wall 463 is threadedly engaged with a thread 427 formed on the shoulder 426 and is also sealingly engaged with the shoulder 426 through a sealing member 401. The outer annular wall 465 is formed on its outer peripheral surface with a thread 467. The outer annular section 461 provided with integrally formed projections 66 and a thread 64 with which the cup-shaped member 82 engages has a thread on an inner peripheral surface of the section 461 which threadedly engages with the thread 467 of the outer annular wall 465.

The shoulder 426 has welded thereto a plurality of circumferentially spaced claws 477. The radially outer section 461 is integrally formed with a plurality of circumferentially spaced ribs 479 which abut against the claws 477 to prevent rotation of the shoulder assembly 458 relative to the other member 416.

Other structures and operation thereof of the embodiment shown in FIG. 6 are substantially similar to those of the embodiment described with reference to FIGS. 1 and 2.

FIG. 7 shows a fifth embodiment wherein parts and members similar to those shown in FIGS. 1 and 2 are designated by like reference characters. In the embodiment shown in FIG. 7, a weld 529 similar to the weld 229 shown in FIG. 3 is formed between a cylindrical portion 522 and a shoulder 526 of an outer member 516. A main body 562 of a shoulder assembly 558 of circumferentially continuous annular cross-section is provided for protecting the shoulder 526 and comprises a first section 561 provided with projections 66 and a thread 64 with which a cup-shaped member 82 engages and a second section 559 formed with a thread 567 engaging with a thread formed on the inner peripheral surface of the first section 561. A mechanism 555 similar to the serrations 373 and 367 shown in FIG. 5 is disposed between the first and second sections 561 and 559 to allow the first and second sections to rotate relative to each other in one direction and prevent them from relatively rotating to each other in the opposite direction.

The shoulder 526 has welded thereto a plurality of circumferentially spaced claws 577 which abut against circumferentially spaced claws 579 on the bottom of the second section 559, to prevent rotation of the shoulder assembly 558 relative to the outer member 516. Other structures and operation thereof of the embodiment shown in FIG. 7 are substantially similar to those of the embodiment described with reference to FIGS. 1 and 2.

FIG. 8 shows a sixth embodiment wherein parts and members similar to those shown in FIGS. 1 and 2 are designated by like reference characters. In the embodiment shown in FIG. 8, a weld 629 similar to the weld 229 shown in FIG. 3 is formed between a cylindrical portion 622 and a shoulder 626 of an outer member 616. A main body 662 of a shoulder assembly 658 of circumferentially continuous annular cross-section is provided for protecting the shoulder 626 and comprises a first section 661 formed with a thread 64 with which a cup-shaped member 82 engages, and a second section 659 having projections 66 formed integrally therewith. The first and second sections 661 and 659 are threadedly engaged with each other at their radially inner peripheral portions as indicated at 667 with an annular sealing member 601 disposed between the radially inner peripheral portions. In addition, a mechanism 655 similar to the serrations 373 and 367 shown in FIG. 5 is disposed between the first and second sections 661 and 659 to allow the first and second sections to rotate in one direction relative to each other but prevent their relative rotations in the opposite direction. The second section 659 has formed therethrough at least one bore for receiving a screw 676 which is threadedly engaged with a threaded bore in a bracket 678 welded to the shoulder 626, thereby to prevent rotation of the shoulder assembly 658 relative to the outer member 616.

Other structures and operation thereof of the embodiment shown in FIG. 8 are substantially similar to those of the embodiment shown in FIGS. 1 and 2.

FIG. 9 shows a seventh embodiment wherein parts and members similar to those shown in FIGS. 1 and 2 are designated by like reference characters. In the embodiment shown in FIG. 9, a weld 729 similar to the weld 229 shown in FIG. 3 is formed between a cylindrical portion 722 and a shoulder 726 of an outer member 716. A shoulder assembly 758 of circumferentially continuous annular cross-section is provided for protecting the shoulder 726 and includes a radially outer peripheral wall 761 having integrally formed projections 66 and a thread 64 with which a cup-shaped member 82 engages, and a radially inner peripheral wall 759 integrally connected to the radially outer peripheral wall 761 and radially spaced therefrom. The radially inner peripheral wall 759 is in sealing engagement with the shoulder 726 through an annular sealing member 701. The radially inner peripheral wall 759 is threadedly engaged with a thread 727 formed on the shoulder 726 and secured thereto through an adhesive layer 777, to prevent rotation of the shoulder assembly 768 relative to the outer member 716.

What is claimed is:

1. A vacuum bottle comprising;
a tubular body including an inner member in the form of a container having an opening through which contents are adapted to be filled in and poured out of said inner member, and a metallic outer member sealingly associated with said inner member and cooperating therewith to define therebetween a vacuum space, said outer member having a tubular portion and a reduced diameter portion located adjacent to said opening and connected to said tubular portion to define a shoulder between said tubular portion and said reduced diameter portion;
a shoulder assembly formed of a high molecular material including a main body having an outer peripheral surface and extending around said reduced diameter portion of said outer member so as to cover said shoulder of said outer member, and a thread formed on the outer peripheral surface of said main body;
a closure associated with said opening as to allow said opening to be opened;
a cup-like member removably and threadedly engageable with said thread formed on said main body of said shoulder assembly so as to cover said closure;
said inner member being formed of metallic material and said outer member being sealingly secured to said inner member to define therebetween said vacuum space;
said inner and outer members being formed of stainless steel;
preventing means for preventing said shoulder assembly from being relatively rotated to said outer member; and
said preventing means comprising claws secured to said shoulder of said outer member, and claw members engaging with said claws on said shoulder, said claw members being in threaded engagement with said main body of said shoulder assembly.

2. A vacuum bottle as claimed in claim 1, wherein said outer member has a substantially cylindrical cross-section, and said shoulder assembly has a circumferentially continuous annular cross-section.

3. A vacuum bottle comprising:
a tubular body including a stainless steel inner member in the form of a container having an opening through which contents are adapted to be filled in and poured out of said inner member, and a stainless steel outer member sealingly associated with said inner member and cooperating therewith to define therebetween a space which is under vacuum, said outer member having a tubular portion and a shoulder located between said tubular portion and said opening;
a shoulder assembly formed of a high molecular material including a main body having an outer circumferential surface and disposed so as to cover said shoulder of said outer member, and a thread formed on said outer circumferential surface of said main body;
a cup-like member removably and threadedly engageable with said thread formed on said main body;
said shoulder assembly cooperating with said shoulder of said outer member to define therebetween an annular space; and
attaching means disposed within said annular space for attaching said shoulder assembly to said outer member and for preventing said shoulder assembly from being rotated relative to said outer member, said attaching means including at least one threaded bore formed in said outer member, and at least one screw engaging with said threaded bore to fix said shoulder assembly to said outer member.

4. A vacuum bottle comprising:
a tubular body including a stainless steel inner member in the form of a container having an opening through which contents are adapted to be filled in and poured out of said inner member, and a stainless steel outer member sealingly associated with said inner member and cooperating therewith to define therebetween a space which is under vacuum, said outer member having a tubular portion and a reduced diameter portion located adjacent to said opening and connected to said tubular portion to define a shoulder located between said tubular portion and said reduced diameter portion;
a shoulder assembly formed of a high molecular material including a main body having an outer circumferential surface and disposed so as to cover said shoulder of said outer member, and a thread formed on said outer circumferential surface of said main body;
a cup-like member removably and threadedly engageable with said thread formed on said main body;
said shoulder assembly cooperating with said shoulder of said outer member to define therebetween an annular space; and
attaching means disposed within said annular space for attaching said shoulder assembly to said outer member and for preventing said shoulder assembly from being rotated relative to said outer member, said attaching means including at least one threaded bore formed in said outer member, and at least one screw engaging with said threaded bore to fix said shoulder assembly to said outer member.

5. A vacuum bottle as claimed in claim 3 or 4, wherein said outer member has secured thereto at least one bracket having formed therein said threaded bore.

6. A vacuum bottle as claimed in claim 5, wherein said shoulder of said outer member has a planar portion extending generally perpendicularly to said tubular portion of said outer member, said bracket being disposed so as to project generally perpendicularly to said planar portion, said screw having it axis extending generally perpendicularly to said planar portion.

7. A vacuum bottle as claimed in claim 5, wherein said shoulder of said outer member has a planar portion extending generally in parallel to said tubular portion of said outer member, said bracket being disposed so as to project generally perpendicularly to said planar portion, said screw having its axis extending generally perpendicularly to said planar portion.

8. A vacuum bottle as claimed in claim 5, wherein said outer member is snap-fitted into said shoulder assembly.

9. A vacuum bottle as claimed in claim 8, wherein said outer member has an annular bead, and said main body of said shoulder assembly has an annular groove into which said annular bead is snapped.

10. A vacuum bottle as claimed in claim 9, wherein said outer member has a substantially cylindrical cross-section, and said shoulder assembly has a circumferentially continuous annular cross-section.

11. A vacuum bottle as claimed in claim 3 or 4, wherein said shoulder assembly includes first and second sections threadedly engaged with each other, said first section having said screw extend therethrough, said second section extending so as to cover a head of said screw, and said thread with which said cup-like member engages being formed on said second section.

12. A vacuum bottle as claimed in claim 11, wherein said outer member has a substantially cylindrical cross-section and said shoulder assembly has a circumferentially continuous annular cross-section.

13. A vacuum bottle comprising:
a tubular body including an inner member in the form of a container having an opening through which contents are adapted to be filled in and poured out of said inner member, and an outer member associated with said inner member and cooperating therewith to define therebetween a space, said outer member having a tubular portion and a shoulder located between said tubular portion and said opening;
a shoulder assembly formed of a high molecular material including a main body having an outer circumferential surface and disposed so as to cover said shoulder of said outer member, and a thread formed on said outer circumferential surface of said main body, said main body comprising radially inner and outer sections separated from each other, said shoulder assembly further including unidirectional means disposed between said inner and outer sections for allowing said inner and outer sections to rotate in one direction relative to each other but preventing their relative rotation in the opposite direction;
preventing means for preventing said shoulder assembly from being rotated relative to said outer member;
a cup-like member removably and threadedly engageable with said thread formed on said main body;
said shoulder assembly cooperating with said shoulder of said outer member to define therebetween an annular space; and
attaching means disposed within said annular space for attaching said shoulder assembly to said outer member.

14. A vacuum bottle as claimed in claim 13, wherein said preventing means comprises at least one rib formed on one of said outer member and said outer section and at least one recess formed on the other thereof for engaging with said rib.

15. A vacuum bottle as claimed in claim 13, wherein said unidirectional means comprises a series of serrations integrally formed on each of said inner and outer sections.

16. A vacuum bottle as claimed in claim 15, wherein said outer member has a substantially cylindrical cross-section and said shoulder assembly has a circumferentially continuous annular cross-section.

17. A vacuum bottle comprising:
a tubular body including an inner member in the form of a container having an opening through which contents are adapted to be filled in and poured out of said inner member, and an outer member associated with said inner member and cooperating therewith to define therebetween a space, said outer member having a tubular portion and a shoulder located between said tubular portion and said opening;
a shoulder assembly formed of a high molecular material including a main body having an outer circumferential surface and disposed so as to cover said shoulder of said outer member, and a thread formed on said outer circumferential surface of said main body;
a cup-like member removably and threadedly engageable with said thread formed on said main body;
said shoulder assembly cooperating with said shoulder of said outer member to define therebetween an annular space; and
attaching means disposed within said annular space comprising a threaded engagement of said shoulder assembly with said shoulder of said outer member for attaching said shoulder assembly to said outer member.

18. A vacuum bottle as claimed in claim 17, further comprising, in addition to said attaching means, preventing means for preventing said shoulder assembly from being relatively rotated to said outer member.

19. A vacuum bottle comprising:
a tubular body including an inner member in the form of a container having an opening through which contents are adapted to be filled in and poured out of said inner member, and an outer member having a substantially cylindrical cross-section associated with said inner member and cooperating therewith to define therebetween a space, said outer member having a tubular portion and a reduced diameter portion located adjacent to said opening and connected to said tubular portion to define a shoulder having a circumferentially continuous annular cross-section located between said tubular portion and said reduced diameter portion, said tubular portion having a closed end located opposite to said reduced diameter portion;
a shoulder assembly formed of a high molecular plastic material including a main body having an outer circumferential surface and disposed so as to cover said shoulder of said outer member, and a thread formed on said outer circumferential surface of said main body;
a first cup-like member removably and threadedly engageable with said thread formed on said main body;
a cover member formed of a synthetic resinous material having a substantially cylindrical cross-section, said cover member being fitted over said tubular portion so as to cover said closed end, and a second cup-like member threadedly engageable with said cover member;
preventing means for preventing rotation of said cover member relative to said tubular portion comprising at least one axially extending groove formed on one of said tubular portion and said cover member, and at least one axially extending protuberance formed on the other thereof for engagement with said axially extending groove;
said shoulder assembly cooperating with said shoulder of said outer member to define therebetween an annular space; and attaching means disposed within said annular space for attaching said shoulder assembly to said outer member.

20. A vacuum bottle as claimed in claim 19, wherein each of said first mentioned cup-like member and said second cup-like member has a shock absorbing member attached to the outer surface of the bottom of the cup-like member.

21. A vacuum bottle comprising:
a tubular body including an inner member in the form of a container having an opening through which contents are adapted to be filled in and poured out of said inner member, and an outer member associated with said inner member and cooperating therewith to define therebetween a space, said outer member having a tubular portion and a reduced diameter portion located adjacent to said opening and connected to said tubular portion to define a shoulder located between said tubular portion and said reduced diameter portion;
a shoulder assembly formed of a high molecular material including a main body having an outer circumferential surface and disposed so as to cover said shoulder of said outer member, and a thread formed on said outer circumferential surface of said main body;
a cup-like member removably and threadedly engageable with said thread formed on said main body;
said shoulder assembly cooperating with said shoulder of said outer member to define therebetween an annular space; and
attaching means disposed within said annular space for attaching said shoulder assembly to said outer member wherein said main body of said shoulder assembly comprises radially inner and outer sections separable from each other and said attaching means comprises a threaded engagement of said inner section with said reduced diameter portion of said outer member, said inner and outer sections being in threaded engagement with each other.

22. A vacuum bottle as claimed in claim 21, further including preventing means for preventing said shoulder assembly from being relatively rotated to said outer member, said preventing means comprising at least one rib formed integrally with said outer section and at least one claw secured to said shoulder of said outer member for engaging with said rib.

23. A vacuum bottle as claimed in claim 22, wherein said outer member has a substantially circular cross-section, and said shoulder assembly has a circumferentially continuous annular cross-section.

24. A vacuum bottle comprising:
a tubular body including an inner member in the form of a container having an opening through which contents are adapted to be filled in and poured out of said inner member, and an outer member associated with said inner member and cooperating therewith to define therebetween a space, said outer member having a tubular portion and a reduced diameter portion located adjacent to said opening and connected to said tubular portion to define a shoulder located between said tubular portion and said reduced diameter portion;
a shoulder assembly formed of a high molecular material including a main body having an outer circumferential surface and disposed so as to cover said shoulder of said outer member, and a thread formed on said outer circumferential surface of said main body;
a cup-like member removably and threadedly engageable with said thread formed on said main body;
said shoulder assembly cooperating with said shoulder of said outer member to define therebetween an annular space;
attaching means disposed within said annular space for attaching said shoulder assembly to said outer member, said attaching means comprising a threaded engagement of said shoulder assembly with said reduced diameter portion of said outer member; and
preventing means for preventing said shoulder assembly from being rotated relative to said outer member, said preventing means comprising an adhesive layer disposed between said shoulder assembly and said reduced diameter portion of said outer member at said threaded engagement.

25. A vacuum bottle as claimed in claim 24, wherein said outer member has a substantially cylindrical cross-section and said shoulder assembly has a circumferentially continuous annular cross-section.

26. A portable vacuum bottle adapted to be hung by an elongated suspending member, comprising:
a tubular body inluding an inner member in the form of a container having an opening through which contents are adapted to be filled in and poured out of said inner member and an outer member having a substantially cylindrical cross-section and sealingly secured to said inner member and cooperating therewith to define a space therebetween which is under vacuum each of said inner and outer members being formed of stainless steel;
said outer member including a tubular portion and a reduced diameter portion located adjacent to said opening and connected to said tubular portion to define a shoulder between said tubular portion and said reduced diameter portion, said tubular portion having a closed end located opposite to said reduced diameter portion;
a shoulder assembly formed of a high molecular plastic material including a main body having an outer circumferential surface and a circumferentially continuous annular cross-section extending around said reduced diameter portion of said outer member so as to cover said shoulder, a thread formed on said outer circumferential surface of said main body, a first projection protruding radially outwardly from said outer circumferential surface of said main body to enable one end of said elongated suspending member to be attached to said first projection;
a second projection integrally formed on said main body and projecting radially outwardly therefrom to enable the other end of said elongated suspending member to be attached to said second projection, said second projection being located in a position substantially diametrically opposite to said first projection; a cover member formed of a synthetic resinous material having a substantially cylindrical cross-section and having a third projection formed integrally therewith and protruding radially outwardly from said cover member to enable the other end of said elongated suspending member to be attached to said third projection, said third projection being axially aligned with said first projection, but spaced therefrom;

first means for preventing rotation of said shoulder assembly relative to said outer member;

second means for preventing rotation of said cover member relative to said tubular portion of said outer member;

a first cup-like member threadedly engageable with said thread formed on said main body of said shoulder assembly;

a second cup-like member in threaded engagement with said cover member; and each of said first cup-like member and said second cup-like member having a shock-absorbing member attached to the outer surface of the bottom of the cup-like member, respectively.

27. A portable vacuum bottle as claimed in claim 26, wherein each of said inner and outer members is formed of metallic material, said outer member being sealingly secured to said inner member to define therebetween said space which is under vacuum.

28. A portable vacuum bottle as claimed in claim 27, wherein said inner and outer members are formed of stainless steel.

* * * * *